J. RECKO.
ANIMAL TRAP.
APPLICATION FILED NOV. 6, 1911.
1,020,448.
Patented Mar. 19, 1912.
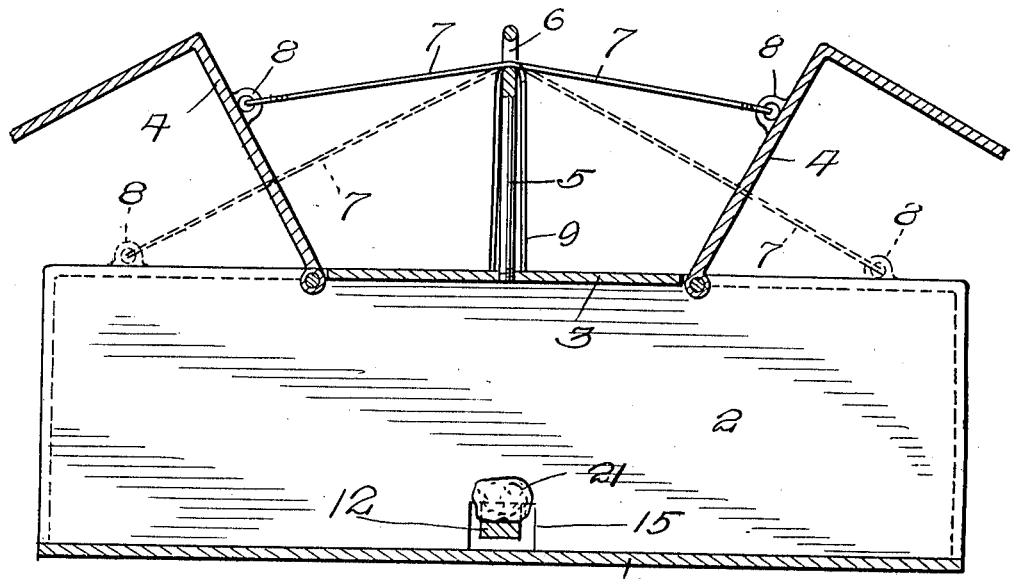
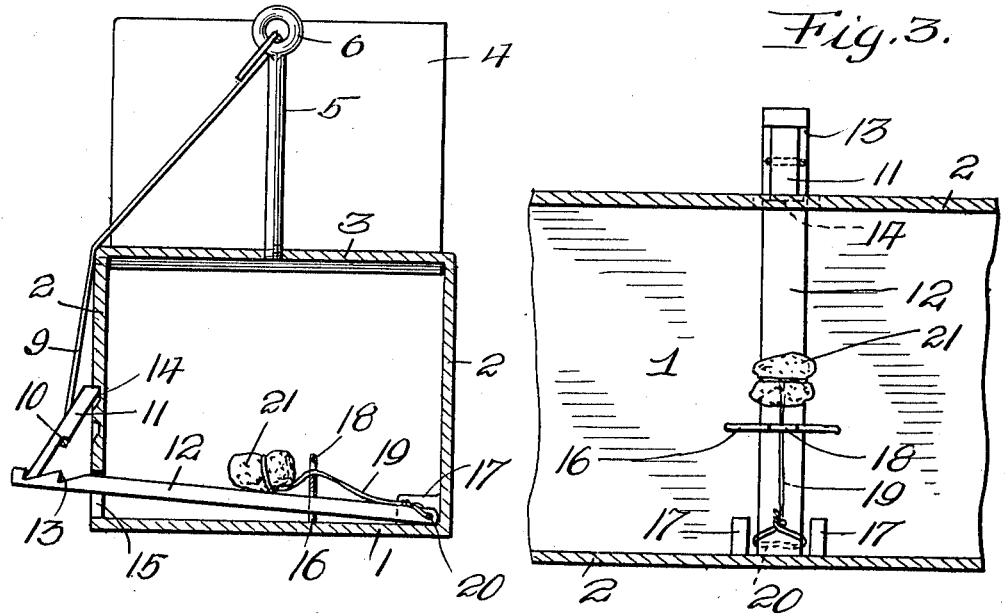

UNITED STATES PATENT OFFICE.

JOSEF RECKO, OF BRIDGEPORT, CONNECTICUT.

ANIMAL-TRAP.

1,020,448.  Specification of Letters Patent.  Patented Mar. 19, 1912.

Application filed November 6, 1911. Serial No. 658,648.

*To all whom it may concern:*

Be it known that I, JOSEF RECKO, a subject of the Emperor of Austria-Hungary, residing at Bridgeport, in the county of Fairfield and State of Connecticut, have invented certain new and useful Improvements in Animal-Traps, of which the following is a specification, reference being had therein to the accompanying drawing.

This invention relates to animal traps, and the objects of my invention are to provide a trap that can be easily set, safely used, manufactured at a comparatively small cost, employed for entrapping rodents or other wild animals without injury to the animal, and efficient for the purposes for which it is intended.

I attain the above objects by a mechanical construction that will be hereinafter specifically described and then claimed, and reference will now be had to the drawing, wherein:

Figure 1 is a longitudinal sectional view of the trap, Fig. 2 is a cross sectional view of the same, and Fig. 3 is a horizontal sectional view of a portion of the trap.

A trap in accordance with this invention comprises a receptacle having both of its ends open and further having a portion of its top open. The receptacle comprises a base plate 1, longitudinal side walls 2 and a top plate 3. The top plate 3 is arranged intermediate the ends of the walls 2, thereby providing the open ends of the receptacle. Hinged or pivotally mounted between the walls 2, adjacent to the transverse edges of the top plate 3, are angle-shaped doors 4 adapted to close the open top and ends of the receptacle.

Mounted in the top plate 3, centrally thereof, is the end of a long eye bolt 5, and extending through the eye 6 of this bolt are the ends of a cable 7, said ends being attached to eyes 8, carried by the tops of the angle-shaped doors 4. The looped end 9 of the cable extends downwardly at one side of the receptacle and is engaged by the shoulder 10 of a prop 11. The prop 11 is held by a shiftable bar 12, said bar having notches 13, one of which receives one end of the prop 11, while the opposite end of the prop engages in one of the notches 14 provided therefor in the outer side of the wall 2.

The shiftable bar 12 extends through an opening 15 provided therefor at the lower edge of the wall 2 and the opposite end of the bar extends through a guide 16, carried by the base plate 1 and between partitions 17 at the opposite side wall 2. The guide 16 spans the shiftable bar 12 and coöperates with the partitions 17 in preventing a sidewise movement of said bar. The top of said guide terminates in an eye 18, and through this eye extends a cable 19 having one end thereof attached to the inner end of the shiftable bar 12, as at 20 and the opposite end thereof to a suitable bait 21.

When the trap is set, the cable 7 is maintained taut. When a rat or other animal attempts to carry away the bait 21, the rod 12 is shifted outwardly and immediately releases the prop 11, which releases the cable 7 and allows the angle-shaped doors to close by gravity.

The trap, with the exception of the eye bolt 5, hinges and eyes, can be made of wood and of any desired size.

What I claim is:—

A trap comprising a receptacle having both of its ends open and further having a portion of its top open, a top plate located centrally of the upper edges of the walls of said receptacle, a vertical eye bolt located centrally of said top plate, angle-shaped doors hinged between the walls of said receptacle adjacent to the transverse edges of said top plate and adapted to close the open ends of said receptacle, a looped cable having the ends thereof extending through the eye of said bolt and attached to the tops of said angle-shaped doors, a shiftable rod extending through an opening provided therefor in one of the side walls of said receptacle and having the opposite end thereof movably held adjacent to the other side wall of said receptacle, a prop having the ends thereof engaged by the outer ends of said bar and the side wall of said receptacle for holding the looped end of said cable, a guide for said bar carried by the bottom plate of said receptacle and having the top thereof provided with an eye, and a cable extending through the eye of said guide and having one end attached to the inner end of said shiftable bar and the opposite end thereof provided with a suitable bait so that
5 a pull upon the bait will shift said bar outwardly to release said prop, cables, and the doors connected thereto.

In testimony whereof I affix my signature in the presence of two witnesses.

JOSEF RECKO.

Witnesses:
M. B. KIELY,
CATHERINE KIELY.

Copies of this patent may be obtained for five cents each, by addressing the "Commissioner of Patents, Washington, D. C."